United States Patent Office 3,005,974
Patented Oct. 24, 1961

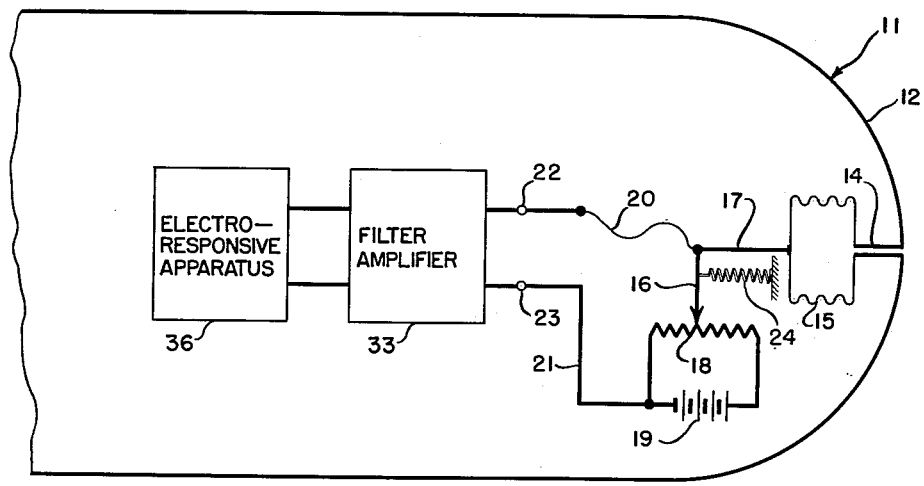
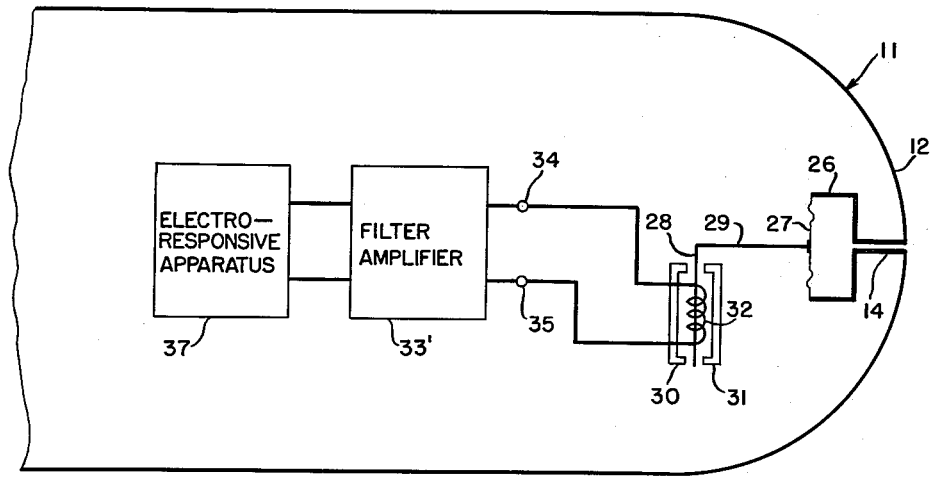

3,005,974
APPARATUS FOR DETECTING THE WAKE
OF A VESSEL
Doyle L. Northrup and Ernest R. Haberland, Washington, D.C., assignors to the United States of America as represented by the Secretary of the Navy
Filed Nov. 5, 1947, Ser. No. 784,210
4 Claims. (Cl. 340—4)
(Granted under Title 35, U.S. Code (1952), sec. 266)

This invention relates to a method and apparatus for detecting the wake of a vessel. More particularly the invention contemplates the method of wake detection in which the changes in pressure in the water resulting from the turbulence thereof caused by passage of the vessel are employed to generate electrical signals. In accordance with the method of the invention, suitable means is provided to employ the energy in the turbulence of the water in the wake of the vessel to generate electrical signals which may be either transient D.C. or A.C. in character.

Prior art methods and devices for detecting ship's wakes have not been entirely satisfactory for a variety of reasons. One of the most widely used of these has been an arrangement employing an optical type bubble detector, in which detection is accomplished by transmitting a beam of light through the water adjacent the vehicle on which the device was mounted, and detecting changes in light transmission characteristics of the water produced by the presence of bubbles. This method has proved unsatisfactory because of the nonuniformity of distribution of bubbles in the wake of most ships. Furthermore, the optical method of detection has proved unsatisfactory for the reason that the background level of transmission changes with the amount of suspended mineral and vegetable matter in the water, and also because the persistence of bubbles in a ship's wake may not be adequate to operate the apparatus; bubbles in the wake of the ship usually surface quickly after the vessel has passed. Also, inertia devices have been employed to detect the wake of a vessel but have not been entirely satisfactory due to limitations of inertia effects.

The instant invention overcomes the foregoing disadvantages and limitations by reason of the fact that the turbulence in a ship's wake is employed to control the detecting apparatus and this turbulence persists considerably longer than the bubbles normally present in the wake; the apparatus required the practice the method of the subject invention is simple and provides a large signal to background ratio.

An object of the invention is to provide a new and improved method of wake detection.

Another object of the invention is to provide a new and improved method of wake detection utilizing the turbulence in the ship's wake.

Another object is to provide a new and improved turbulence detector characterized by a high signal to background ratio.

A further object is to provide a new and improved method of wake detection in which the apparatus employed to practice the method is characterized by simplicity of construction and operation.

A further object is to provide a new and improved turbulence detector which is adapted to be sensitive to a ship's wake for a considerable period of time after the ship has passed.

A further object is to provide a new and improved method of obtaining signals suitable for steering an automotive vehicle in response to changes in pressure of the water in a ship's wake.

A further object is to provide a new and improved method of measuring the degree of turbulence of a ship's wake.

Still a further object is to provide a new and improved turbulence detector having novel means for transforming the turbulence in the wake of the ship into an electrical signal.

Other objects and advantages not specifically set forth hereinbefore will be apparent from the following specification taken in connection with the accompanying drawings, in which:

FIG. 1 is a diagrammatic view of one embodiment of apparatus suitable for practicing the method of the invention; and FIG. 2 is a diagrammatic view of a preferred embodiment of apparatus suitable for practicing the method of the invention.

Referring now to the drawings and in particular to FIG. 1 thereof, there is shown thereon an automotive vehicle, for example a torpedo, adapted for movement through water, said vehicle being generally designated by the reference numeral 11 and having a wall portion 12 in which there is an aperture adapted to receive therein a tube 14. The tube 14 communicates with an expansible pressure responsive device 15, in the embodiment shown a bellows, which may be of the type known in the trade as a hydron bellows, the front wall of the bellows being preferably fixed and the back wall portion thereof having attached thereto an arm 17 to which is secured a moving contact arm 16 of a potentiometer 18 which has connected thereacross a suitable source of potential 19. The bellows is preferably biased against the pressure within the chamber 15 by a spring 24. An arrangement is thereby provided in which changes of pressure within the water surrounding the nose of the torpedo, for example, those caused by the turbulence of a ship's wake, are changed into electrical impulses of a transient nature which are conducted by leads 20 and 21 to terminals 22 and 23 respectively, the transient D.C. signal at terminals 22 and 23 being adapted, if desired, after passing through a filter 33 for reasons to be presently described, to operate electroresponsive apparatus in a manner which will be well known to those skilled in the art, the apparatus, shown in block form and designated by the reference numeral 36 being control, indicating, measuring, or recording apparatus as desired. The apparatus designated in block form at 33 may, if desired, include means for amplifying the signal voltage.

It will be readily understood that, as the torpedo 11 changes its depth, the normal pressure in the water surrounding the torpedo varies, causing the arm 16 to assume different settings on potentiometer 18. For this reason, it is desirable to provide discriminating or filtering means 33 to prevent the component of the voltage caused by movement of arm 16 in response to gradual expansion or contraction of the bellows caused by changes in depth resulting from yaw and pitch of the torpedo from reaching the electroresponsive apparatus 36. This component will be of a frequency of the order of zero to five c.p.s. Also, certain component frequencies above 100 c.p.s. are likely to represent energy due to the torpedo's own noises. Apparatus 33 may be filtering apparatus of conventional design for discriminating against all frequencies except those, for example, between 5 and 100 c.p.s. The voltage within the selected frequency range which is passed by filter 33, energizes the electroresponsive device 36, the turbulence of a ship's wake causing the production of a signal within the frequency range 5-100 c.p.s.

Referring now particularly to FIG. 2, the aforementioned tube 14 communicates with a chamber 26 having a flexible wall or diaphragm 27 which is sensitive to changes in the pressure of the fluid within the chamber which are caused by changes in pressure in the water adjacent to tube 14 and external to the torpedo. The flexible wall 27 has secured thereto an arm 29 which is adapted to move a diaphragm or armature 28 disposed within the field set up by permanent magnets 30 and 31, the diaphragm or armature member 28 having a coil 32 operatively associated therewith whereby movement of the diaphragm or armature in response to changes in the pressure in chamber 26 generates a fluctuating voltage in the coil, in a manner well known to those skilled in the art. The voltage generated in the coil is applied by way of terminals 34 and 35 to the input of an amplifier and filter 33', which may be of conventional design. Preferably the filter apparatus designated 33' is adapted to pass only frequencies within the range between 5 and 100 cycles per second, it having been found that frequencies below 5 cycles per second should preferably be discriminated against since the torpedo pitch and yaw frequencies are in the range zero to 5 cycles per second, and that preferably frequencies above 100 cycles per second should be discriminated against for the reason aforementioned that the self noise of the torpedo usually lies within this frequency range and presents an obstacle to the use of the higher frequencies. The apparatus shown in block form and generally designated by the reference numeral 37 is any suitable indicating, measuring, or control apparatus responsive to voltages within the frequency range passed by filter 33'.

Whereas the transducer of FIG. 2 has been shown as a magnetic type, it will be understood that other types, for example, a crystal type could be utilized, if desired, for generating an electrical signal in response to changes in the pressure applied to diaphragm 27. If desired, the tube 14 may be flush with the nose of the torpedo, or may extend somewhat beyond the nose if desired, to achieve a desired minimum background.

It will be understood that the control apparatus designated in block form at 36 or 37 may be adapted for steering the torpedo, or if desired triggering the firing control mechanism of the torpedo.

Apparatus suitable for practicing the method of the invention has now been described, and the method of detecting the wake of a vessel will appear more clearly as the description proceeds. The turbulence in the water of the ship's wake is employed to secure mechanical movements proportional to the pressure changes, the mechanical movements being converted into electrical signals of either A.-C. character, as shown in FIG. 2, or transient D.-C. character as shown in FIG. 1, the signals being preferably filtered and amplified and thereafter utilized to provide detection of the ship's wake or measurement of the degree of turbulence in the wake, as the case may be.

Whereas the invention has been shown and described with reference to two examples of suitable apparatus which give satisfactory results, it will be understood by those skilled in the art to which the invention pertains, after understanding the invention, that various changes and modifications may be made in the apparatus employed in the practice of the invention without departing from the spirit or scope of the invention, and it is intended, therefore, in the appended claims to include all such changes and modifications.

This invention may be manufactured and used by or for the Government of the United States of America for governmental purposes without the payment of any royalties thereon or therefor.

What is claimed as new and desired to be secured by Letters Patent of the United States is:

1. Apparatus of the character disclosed adapted to be employed on a moving underwater vehicle for detecting the presence of a ship's wake, comprising in combination, a hydraulically compliant pressure responsive device mounted in the nose of said vehicle, means including a duct for providing fluid communication between said pressure responsive device and the fluid medium at said nose through which said vehicle travels for providing a hydro-acoustic filtering of predetermined pressure frequencies and for transmitting changes in the pressure of the medium including changes caused by said wake to said pressure responsive device, a pair of permanent magnets in mutually spaced relation for setting up a magnetic field therebetween, means including a movable armature, said armature being disposed within said field and between said pair of magnets and having a coil arranged thereabout operatively connected to said compliant pressure responsive device for generating an alternating electrical voltage proportional to the rate of said changes, and electroresponsive means energized by said voltage due to said wake.

2. In apparatus of the character disclosed adapted to be mounted within a torpedo for detecting the presence of a ship's wake in the fluid through which said torpedo moves, in combination, a torpedo having an aperture in the nose thereof, means forming a chamber having a flexible diaphragm included therein, a tube communicating between said chamber and said aperture whereby changes in the pressure of said fluid cause movement of said flexible diaphragm as the torpedo enters the wake, electrical signal generating means including an armature and moving coil system operatively connected to be mechanically driven by said flexible diaphragm and responsive to movement thereof for generating a voltage proportional to changes in the pressure in said fluid caused by turbulence due to the ship's wake, and electro-responsive detecting and/or indicating means operatively connected to said voltage generating means.

3. In apparatus of the character disclosed adapted to be mounted within a torpedo for detecting the presence of a ship's wake in the fluid medium through which said torpedo moves, in combination, a torpedo having an aperture in the nose thereof, means forming a closed chamber within said torpedo, said chamber having a flexible diaphragm included therein, means communicating between said chamber and said aperture whereby changes in the pressure of said fluid cause movement of said flexible diaphragm as the torpedo enters said wake, transducer means for converting mechanical to electrical energy, an operative mechanical connection between said transducer means and said diaphragm whereby movement of the diaphragm in response to changes in the pressure in said chamber causes the generation of a voltage proportional to the rate of such changes, means for amplifying said voltage, and electro-responsive detecting and/or indication means operatively connected to said amplifying means for detecting and indicating said wake.

4. Apparatus according to claim 3 wherein said transducer means comprises a magnetic circuit including energizing means therefor, a movable magnetic member mounted in predetermined position with respect to said magnetic circuit and adapted to be moved in response to changes in the pressure within said chamber, and a coil mounted in predetermined position with respect to said circuit and magnetic member and adapted to have a voltage generated therein when said magnetic member is moved.

References Cited in the file of this patent

UNITED STATES PATENTS

| | | |
|---|---|---|
| 1,233,199 | De Fungo-Giera | July 10, 1917 |
| 1,255,034 | Mason | Jan. 29, 1918 |
| 1,420,231 | Aliquo | June 20, 1922 |
| 1,429,497 | Fessenden | Sept. 19, 1922 |
| 2,300,565 | Goloviznin | Nov. 3, 1942 |
| 2,361,177 | Chilowsky | Oct. 24, 1944 |
| 2,398,432 | Livermore | Apr. 16, 1946 |
| 2,403,535 | Kremer | July 9, 1946 |
| 2,409,632 | King | Oct. 22, 1946 |
| 2,715,717 | Keithley | Aug. 16, 1955 |

FOREIGN PATENTS

| | | |
|---|---|---|
| 26,737/01 | Great Britain | May 1, 1902 |
| 336,368 | Great Britain | Oct. 16, 1930 |